UNITED STATES PATENT OFFICE.

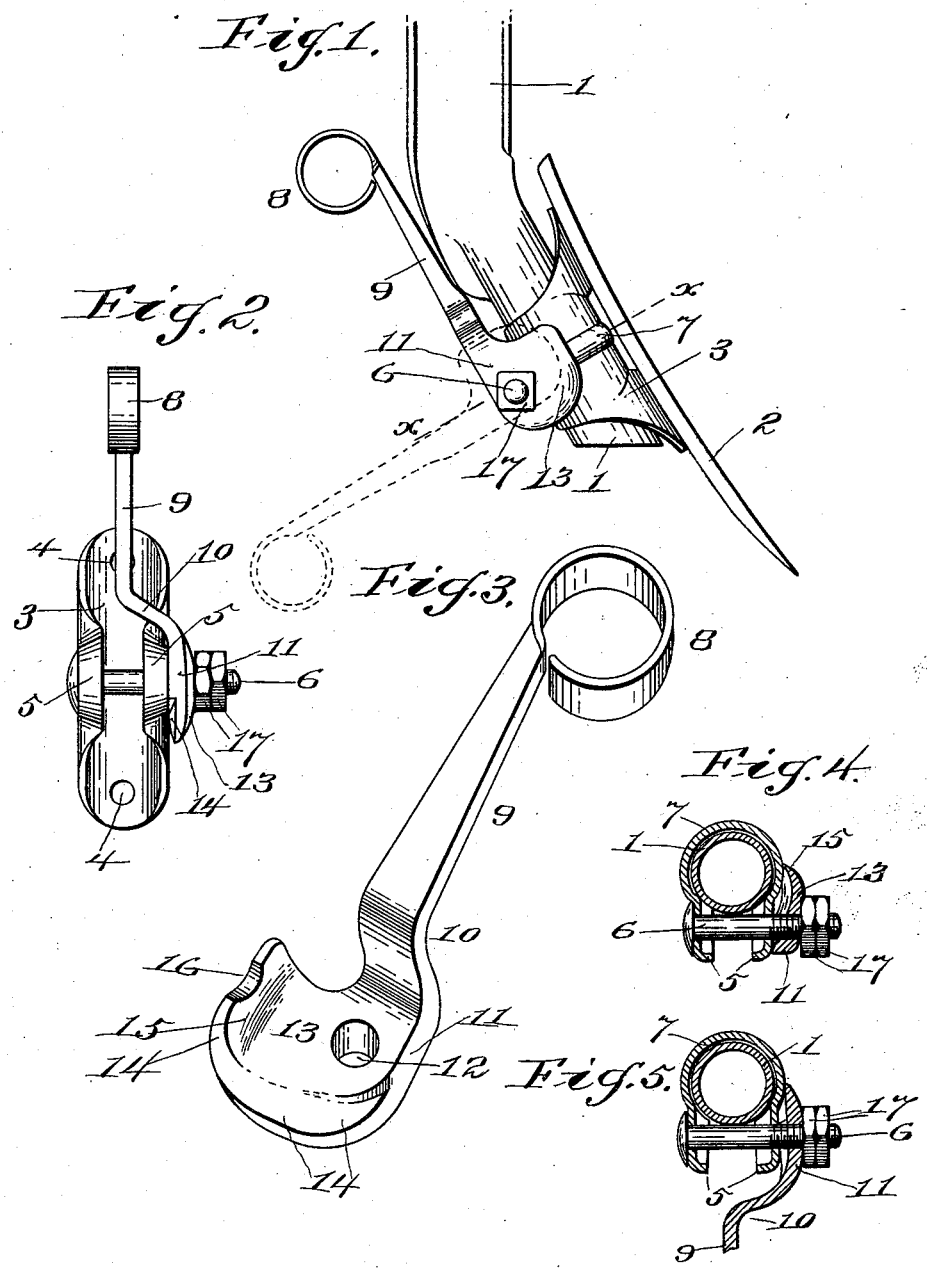

CHARLES E. LOGAN AND ALLEN R. BARNETT, OF MILL GROVE, MISSOURI.

SHOVEL-FASTENER FOR CULTIVATORS.

1,010,159.  Specification of Letters Patent.  Patented Nov. 28, 1911.

Application filed February 10, 1911. Serial No. 607,734.

*To all whom it may concern:*

Be it known that we, CHARLES E. LOGAN and ALLEN R. BARNETT, citizens of the United States, residing at Mill Grove, in the county of Mercer and State of Missouri, have invented certain new and useful Improvements in Shovel-Fasteners for Cultivators, of which the following is a specification.

This invention relates to plows or cultivators, and pertains especially to a hand device for attaching plow-points, shovels, and teeth to the shank or stock of plows and cultivators.

The object of the invention is to provide novel and peculiar means for operating a split-sleeve stock receiver of plow-points, shovels or cultivator teeth in attaching them to a hanger, shank, or stock of a plow or cultivator, without operating bolts and nuts, and without employing tools or implements in such operation.

A further object of the invention is to provide a hand lever having an eccentric head provided with a cam for contracting and releasing a split-sleeve or shank holder. It is well known that such sleeves or holders are usually contracted and expanded by operating a nut or nuts on one end of a bolt which extends through ears on the sleeve, but according to our invention we avoid such operation or adjustment as well as the use of a wrench or implement in attaching and detaching a shovel, cultivator tooth or other article attachable to the shank or stock of a plow or cultivator.

In the accompanying drawings forming part of this application: Figure 1 is a side elevation of part of a shank or stock showing the application of the invention, the dotted lines showing the lever in released position. Fig. 2 is a rear view of the device. Fig. 3 is a detail perspective view of the lever-head. Fig. 4 is a section on the line x—x, Fig. 1. Fig. 5 is a similar view with the parts in released position.

The same reference numerals denote the same parts throughout the several views of the drawings.

In carrying out our invention and for the purpose of illustrating the same, we employ a plow-stock or cultivator-shank 1, and a plow-point or shovel 2, having a split-sleeve or stock receiver 3, provided with the usual securing holes 4, and a pair of lugs 5, through which a bolt 6 extends, so as to leave a screw end projecting from one of the lugs of said pair. The central portion of the receiver or sleeve has a convexed bead or rib 7 encircling it opposite the lugs 5, and the function of said raised bead or rib will be hereinafter more fully described.

The hand lever is provided with a hand grasp 8, and the latter with the stem 9 of the lever are swingable vertically in the central plane of the receiver 3, by reason of an off-set 10, between the lever-stem and the lever-head 11.

The lever head 11 has an eccentric hole 12, substantially in line with the lever-stem 9, and the eccentric wing 13 of the head has a cam 14 extending from adjacent the hole 13 and terminating in an inturned flange 15, which has a cutout or notch 16 in its edge for engaging the bead or rib 7, so as to assist in holding the lever in locked position. The lever-head is properly mounted on the projecting end of the bolt 6, by a pair of lock-nuts 17, or other suitable or convenient means, so as to permit the lever head to be turned in contracting and releasing the receiver with respect to the stock or shank.

It is obvious that the receiver may be raised and lowered, and that it may be turned upon the stock or shank, and secured in desired positions desirable for a plow-point, shovel or tooth, by simply operating the lever; and that such lever affords convenient means (in unlocked position) for raising, lowering and turning the receiver on the stock or shank.

It will be understood that various mechanical changes may be made in the practical application of the device, without departing from the spirit of the invention as set up in the claims now to follow.

Having thus described our invention what we claim as new and desire to secure by Letters Patent is:

1. The combination, with a split receiver for plow cultivator stocks, of a lever for operating the receiver, comprising a head pivoted upon the side of the receiver, and a cam face on the inner side of the head for engaging the side of the receiver in a clamping operation.

2. The combination, with a plow stock receiver, of a lever for operating the receiver in a clamping operation, comprising a head pivoted upon the side of the receiver, a wing perpendicular to the head, and a cam face formed on the inner side of the head and on the edge of the wing for engaging the side of the receiver.

3. The combination, with a plow stock receiver, of a lever for operating the receiver, comprising a head pivoted to one side of the receiver, a wing projecting from the inner face of the head, and a cam face on said inner face eccentric to the pivot and extending from the front edge of the head into the edge of the wing for engaging the side of the receiver in a clamping operation.

4. A lever for operating plow stock receivers, comprising an eccentric head, a cam face on the inner side of the head, and an inturned notched wing on the head for engaging the side of the receiver in a clamping operation.

5. A lever for operating split sleeve plow stock receivers, such lever comprising a cam head pivoted to the side of the receiver, and a hand portion off-set from said head so as to position said portion for swinging centrally with respect to the receiver.

In witness whereof we hereunto set our hands in the presence of two witnesses.

CHARLES E. LOGAN.
ALLEN R. BARNETT.

Witnesses:
 LON M. YOUNG,
 THOS. BROFFETT.

Copies of this patent may be obtained for five cents each, by addressing the "Commissioner of Patents, Washington, D. C."